UNITED STATES PATENT OFFICE.

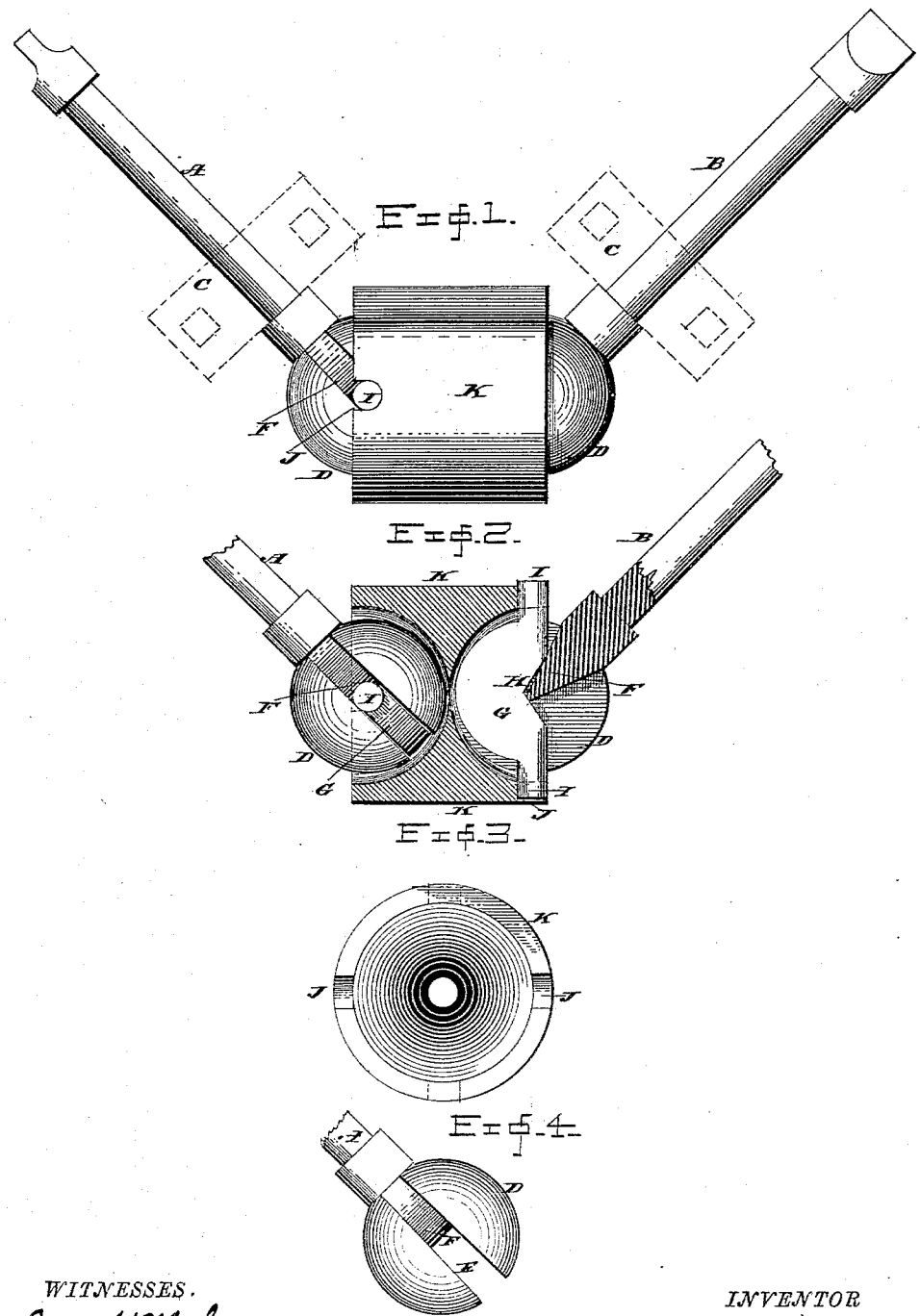

CHARLES PERRIN, OF SPRINGFIELD, OHIO, ASSIGNOR OF ONE-THIRD TO CHARLES E. MEYER, OF SAME PLACE.

UNIVERSAL JOINT.

SPECIFICATION forming part of Letters Patent No. 384,388, dated June 12, 1888.

Application filed October 31, 1887. Serial No. 253,826. (No model.)

*To all whom it may concern:*

Be it known that I, CHARLES PERRIN, a citizen of the United States, residing at Springfield, in the county of Clark and State of Ohio, have invented certain new and useful Improvements in Universal Joints, of which the following is a specification, reference being had therein to the accompanying drawings.

This invention relates to certain new and useful improvements in universal joints designed principally for coupling sections of shafting together.

It consists, essentially, of the shaft-sections constructed with slotted heads, of plates which respectively fit snugly in said slots, and a sleeve fashioned to receive the heads and having bearings in which are fitted the ends of the plates, the said ends being reduced to constitute journals.

In the accompanying drawings, forming a part of this specification, and on which similar letters of reference indicate the same or corresponding features, Figure 1 represents a plan view of my improved universal coupling, showing two sections of shafting; Fig. 2, a sectional view of the sleeve and a portion of one section of shafting, showing one plate in side elevation and the other plate and a portion of the other section of shafting also in elevation; Fig. 3, a detail end view of the sleeve, and Fig. 4 a detail view of the head and of a section of shafting.

The letters A and B designate two sections of shafting of any of the known kinds, and the letter C suitable boxes in which they are mounted. Each section at the end where they are to be connected is provided with an enlargement or head, D, preferably of spherical form and having an open slot, E, therein, which extends entirely through the head, save that portion which is occupied by the end F of the shaft. This end is tapered, as seen in Fig. 2, so as to allow the sections of shafting to be placed at a greater or less angle to each other.

The letter G refers to a metallic plate, preferably of the form shown in Fig. 2, in which one edge is of about the same contour as the head, while the other edge is provided with a V-shaped notch, H, which is placed upon the contracted end F of the shafting. This plate is of such size as to snugly fit in the slot E without lost motion, and, being broad and flat, is found to be strong and to be capable of long use without material wear. The ends of the plate G are reduced to form journals I, which have bearings in recesses J, formed in the ends of the stout metallic sleeve K. This sleeve is constructed with semi-spherical recesses—one at either end—into which the respective heads H of the sections fit. The position of the plates G with respect to each other is that of a right angle. The boxes C serve not only to support the sections of shafting, but also to maintain the heads within the sleeve K and against the plates H.

I have found the device to be strong and smooth and easy in its movements, and, owing to the broad contact between the heads and the plates G afforded by their shape, the wear is very slow and lost motion reduced to a minimum.

The device is intended to be used as well in machines where it is desired to transmit motion in an angular direction as in line-shafting.

The sections of shafting shown in Fig. 1 are at right angles to each other; but the angle, it will be observed, may be changed to suit the particular circumstances.

I am aware that two semi-spherical sockets formed in a single block or structure are not new in universal joints. I am also aware that a hollow shaft having a slotted ball at one end, and in which slot is permanently fitted a segmental die connected to the ball by the two right-angle pins, one fitted in a diametrical opening in the ball and the other fitted to the ends of the die and passing through the first-named pin, have heretofore entered into the construction of a universal safety-coupling. I desire to be understood as disclaiming such devices; but What I do claim is—

1. In a universal joint, the combination, with two sections of shafting having slotted spherical heads and tapered at their ends, and journal-boxes which maintain the shafts from moving away from each other, of broad plates loosely fitted in said slots, respectively, and otherwise disconnected from the heads, notched to receive the tapered ends of the shafts, and terminating at each end in an integral journal, and a sleeve having a spherical recess at each end in which the heads are mounted, and open bearings in each end in which plate-journals are mounted and held by the shafts and their boxes.

2. In a universal joint, the combination of a section of shafting having a spherical head provided with a slot extending through the greater portion thereof and a plate terminating in an integral journal at each end loosely fitted in said slot and otherwise disconnected from the head, and a sleeve having a spherical recess into which the said head is fitted and having bearings in which said plate-journals are mounted.

In testimony whereof I affix my signature in presence of two witnesses.

CHARLES PERRIN.

Witnesses:
A. A. YEATMAN,
C. E. MEYER.